United States Patent
Vittori

[11] 3,848,891
[45] Nov. 19, 1974

[54] FRONT WHEEL DRIVE CYCLE

[76] Inventor: Angelo James Vittori, 529 Northwest 9th St., Chisholm, Minn. 55719

[22] Filed: Aug. 6, 1973

[21] Appl. No.: 385,980

[52] U.S. Cl. ............. 280/250, 280/242, 280/249
[51] Int. Cl. ............................................ B62m 1/14
[58] Field of Search ....... 280/211, 242 R, 249, 240, 280/250, 289

[56] References Cited
UNITED STATES PATENTS
| | | | |
|---|---|---|---|
| 155,183 | 9/1874 | Dale et al. | 280/249 |
| 2,995,384 | 8/1961 | Rich | 280/289 |

FOREIGN PATENTS OR APPLICATIONS
| | | | |
|---|---|---|---|
| 354,310 | 10/1905 | France | 280/250 |
| 18,135 | 7/1916 | Great Britain | 280/250 |
| 22,678 | 7/1910 | Great Britain | 280/250 |

Primary Examiner—M. Henson Wood, Jr.
Assistant Examiner—George M. Libman

[57] ABSTRACT

A manually powered front wheel drive cycle particularly adaptable for use by paraplegic individuals. A drive train has a first drive linkage operably connected to front wheel means for rotation of the front wheel upon actuation of the drive train. The first drive linkage extends upward to a power transmission assembly. A second drive linkage extends rearward from the power transmission assembly to a hand crank mechanism. A tiller bar is connected between the power transmission assembly and the hand crank mechanism. Operation of the hand crank mechanism by the rider effects movement of the cycle. Lateral movement of the hand crank mechanism rotates the tiller bar and front wheel means for steerage of the cycle.

11 Claims, 5 Drawing Figures

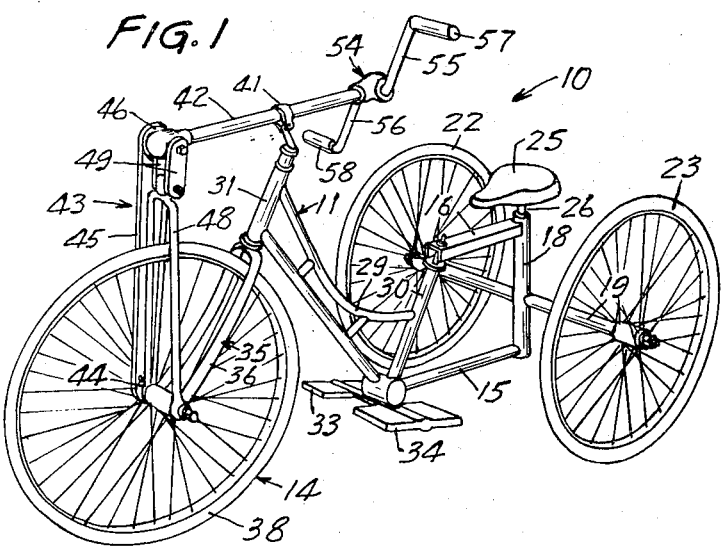

FRONT WHEEL DRIVE CYCLE

BACKGROUND OF THE INVENTION

In the field of transportation, bicycles have long been popular as an inexpensive mode of conveyance, while being the most efficient form of transportation known. The bicyclist has the highest efficiency among moving creatures and machines, consuming roughly .15 calories per gram per kilometer, in contrast to a man walking unaided consuming approximately .75 calories per gram per kilometer. The development of the bicycle over the years preceded and contributed to substantial technological development, leading to such advanced machines as the automobile and airplane. Yet the bicycle remains a leader in providing non-polluting conveyance.

Typically a bicycle is powered through a rear wheel chain drive mechanism driven with a pair of foot pedals rotated by the legs of the rider in a smooth, rotary motion at a speed between 60 and 80 revolutions per minute. Paraplegic individuals do not have the use of their legs and have heretofore been deprived of the pleasure, convenience and economical transportation afforded by a bicycle. Such individuals require arm powered cycles generally of the three wheeled or tricycle type for purposes of stability. Such three wheeled arm powered cycles are known in the prior art. See U.S. Pat. No. 394,429 to Yingst and U.S. Pat. No. 1,873,047 to Schimmel et al. However, such prior art cycles suffer from deficiencies which limit or negate practicality. Typically the drive mechanism of these cycles is a rotary hand crank mechanism mounted over the front fork of the cycle and rotatable about a horizontal axis parallel to the axis of rotation of the wheel. The hand crank mechanism is connected to the front wheel through a suitable driving connection as a sprocket chain. The center of rotation of the hand crank mechanism is oftentimes in alignment with or in close proximity to the vertical turning axis of the front wheel. For example, see U.S. Pat. No. 505,373 to Sanford; U.S. Pat. No. 1,604,496 to Stevens; and U.S. Pat. No. 3,485,510 to Merlan. In such a configuration, turning of the front wheel is difficult and awkward while at the same time operating the hand crank mechanism. Additionally, the application of uneven force at either hand causes unwanted turning of the front wheel.

In the use of such cycles of the prior art, the seating and operating position of the rider is uncomfortable. As the weight of the rider bears forward upon operating the drive mechanism, the center of gravity of the rider-cycle configuration is displaced forward as compared to a conventional bicycle, lending instability to the configuration and rendering steering more difficult under the additional weight imposed upon the front wheel. The self-centering characteristic of the front wheel following a turn is poor. Controlled turning of the front wheel is impeded due to the relatively low degree of lateral leverage available through the crank mechanism as compared with a conventional handle bar on a typical rear wheel drive bicycle.

SUMMARY OF THE INVENTION

The present invention relates to a rider-powered cycle of the three wheeled or tricycle variety having an arm powered front wheel drive mechanism particularly adapted for use by paraplegic individuals. A front wheel assembly having a rotatable front wheel is connected to the cycle frame and pivotal about a vertical axis for steering. A drive train includes a first drive linkage operably connected to the front wheel axle for rotation of the front wheel upon actuation of the drive train. The first drive linkage extends generally upward from the front wheel to a power transmission assembly mounted to the front wheel assembly. A second drive linkage extends from the power transmission assembly rearwardly toward the cycle seat. The second drive linkage engages a hand power means such as a rotary crank mechanism in operating proximity to the cycle seat. A tiller assembly extends from the front wheel assembly and supports the hand power mechanism. Operation of the hand power mechanism by the rider effects rotation of the front wheel and forward movement of the cycle. Turning of the cycle is effected by lateral movement of the hand power mechanism and thus the tiller assembly. The center of gravity of the rider-cycle configuration is rearward to promote stability of the vehicle and facilitate steering. The rider assumes a comfortable seating position while being in operating proximity to the hand crank mechanism. Optionally, there could be provided foot pedals and a rear wheel drive mechanism to form a binary drive cycle.

An object of the invention is to provide a manually powered cycle usable by paraplegic individuals, equipped with a hand powered mechanism. A second object of the invention is to provide such a cycle having a rearwardly disposed center of gravity to facilitate steering and stability. A further object of the invention is to provide such a cycle having a tiller assembly for ease of steering and centering of the steering wheel following a turn. A further object of the invention is to provide such a cycle providing greater comfort to the rider than such cycles of the prior art. Further objects of the invention will become apparent upon the following description.

IN THE DRAWINGS

FIG. 1 is a perspective view of a manually powered cycle according to the present invention;

FIG. 2 is a top plan view of the cycle of FIG. 1;

FIG. 3 is a side elevational view of the cycle of FIG. 1 having one wheel removed for purposes of illustration;

FIG. 4 is a sectional view of a portion of the cycle of FIG. 2 taken along the line 4—4 of FIG. 2; and FIG. 5 is a side elevational view of a second embodiment of a cycle according to the present invention.

DESCRIPTION OF PREFERRED EMBODIMENTS

Referring to the drawings, there is shown in FIGS. 1 through 3 a manually powered cycle 10 constructed according to one embodiment of the present invention. Cycle 10 has a frame 11 to which there is rearwardly connected rear ear wheel assembly 12, and forwardly connected a front wheel assembly 14. Frame 11 includes a pair of parallel, vertically spaced rearwardly extending frame members 15, 16 connected by a vertical strut 18. Rear wheel assembly 12 is fastened to the vertical strut 18. A rear axle 19 is centrally gripped in a bore 20 intermediately located in strut 18. Rear wheels 22, 23 are rotatably assembled by suitable bearing structure at either lateral end of rear axle 19.

A seat 25 is vertically adjustable as by being mounted on shaft 26 telescopically engaging the upper open portion of strut 18, held in the selected vertical orientation by locking bolt 28. The weight of a cyclist mounted on seat 25, it may be seen, is primarily disposed over the rear wheel assembly 12 to facilitate steering with the front wheel assembly, and lend stability to the cycle.

A front frame section 29 is connected between the rearward frame members 15, 16, as by a bar 30, and extends away therefrom in an upwardly inclined direction. The upper end of frame section 29 is connected to a rearwardly inclined tubular housing or fixed post 31 adapted to rotatably accommodate a portion of the front wheel assembly 14. Fixed foot rests 33, 34 are attached to the forward frame section adjacent the lower end of the bar 30 to support the feet of the cyclist. Foot rests 33 and 34 are located in general vertical alignment with the double hand crank assembly 54.

The front wheel assembly 14 includes a forked member 35 having a pair of laterally spaced symmetrical legs 36 straddling a front wheel 38. Front wheel 38 is rotatably mounted between the lower ends of legs 36 of fork member 35. Legs 36 extend upward and rearward from front wheel 38, being joined at the upper ends by a shoulder. A shaft (not shown) extends upward from the shoulder through the fixed post 31, being rotatably accommodated therein by suitable thrust bearings or the like. A head 40 attached to the shaft of the forked member extends outward of the opposite end of the fixed post 31.

A clamp 41 rigidly connects a generally horizontally disposed tiller bar 42 to the head 40. Bar 42 is an elongated tubular member of a fixed length extended in opposite generally horizontal directions from clamp 41. Clamp 41 permits longitudinal adjustment of the bar 42 whereby the bar 42 can be adjusted relative to seat 25. Rotation of the tiller bar 42, it may be seen, effects rotation of the forked member 35 to turn or steer the front wheel 38.

Manual power means of the cycle 10 includes a hand powered mechanism 54 operable through a drive or power train 43 to effect rotation of the front wheel 38. Drive train 43 includes a first drive linkage, a power transmission unit or assembly and a second drive linkage. The first drive linkage is functionally connected between the front wheel 38 and the power transmission unit. Second drive linkage is functionally connected between the power transmission unit and the hand power mechanism 54. The first drive linkage is constituted as a chain and sprocket drive including a front wheel sprocket 44 operably connected to the front wheel 38 at the center thereof. A closed loop or endless drive roller chain 45 engages the teeth of front wheel sprocket 44 and extends upward therefrom to engage sprocket teeth located on the outer periphery of a second or power transmission sprocket 46 located above front wheel 38. A pair of fixed, rigid parallel support members 48 are connected at the lower ends on either side of the fixed axle of front wheel 38 and extend upward therefrom. A pair of elongated plates 49 are connected respectively to the upper ends of support members 48 and extend upward therefrom. Plates 49 are attached to the forward end of bar 42. Power transmission sprocket 46 is rotatably connected between and supported by the plates 49.

There is shown in FIG. 4, integral with sprocket 46, a transverse shaft 50 A bevel gear 40 is secured to shaft 52. Sprocket 46, bevel gear 50 and shaft 52 comprise the power transmission unit.

The second drive linkage includes an elongated drive shaft 51 rotatably housed in and in axial alignment with tiller bar 42. Suitable bearings 51A or the like rotatably accommodate the drive shaft 51 in tiller bar 42. Drive shaft 51 extends outward of either end of the tiller bar 42 and has a second bevel gear 53 fitted on the forward end situated in meshing relationship with the bevel gear 50, whereby axial rotation of drive shaft 51 effects rotation of the sprocket 46.

The hand power mechanism is constituted as a hand crank assembly 54 including a hand crank having two oppositely extended arms 55, 56. The outer ends of each arm 55, 56 are provided with horizontally extended tubular handles 57, 58 adapted to be hand gripped. Interior or horizontally aligned ends of the arms 55, 56 are joined by a horizontal segment 60, as shown in FIG. 2. Horizontal segment 60 passes through a housing 61 secured on the rearward end of tiller bar 42. The horizontal segment 60 is axially rotatable in housing 61 and has secured to it a circular bevel gear 62 in proximity to the rearward end of drive shaft 51. A fourth bevel gear 63 is mounted on the rearward end of drive shaft 51 and is situated in meshing relationship with the third bevel gear 61 disposed on the horizontal segment 60.

Operation of the hand crank assembly 54, by rotary movement of the handles 57, 58, it is apparent, drives the front wheel 38 to thus propel the cycle 10. Steering is accomplished by lateral or sideways movement of hand crank assembly 54 to pivot the front wheel assembly 14 about fixed post 31 on frame 11. Tiller bar 42 serves to move the steering function and powering function rearward, to a location remote from the turning axis of front wheel 38. The hand crank mechanism 54 is located in a position where it is comfortably operated by the cyclist mounted on seat 25. Tiller bar 42 provides good leverage for steering as well as good self-centering characteristics following a turn. Low weight is imposed on front wheel assembly 14 thereby to facilitate steering. Uneven pressure at either of the handles 57, 58 will not result in unwanted turning.

Referring to FIG. 5, there is shown a second embodiment of the invention, indicated generally at 65. The parts of cycle 65 correspond to cycle 10 shown in FIGS. 1 to 3 that are identical and are identified with the same reference numerals with the suffix A.

Cycle 65 has a drive and steering means, indicated generally at 66 for transmitting torque to the front wheel 38A and for steering the wheel 38A about the longitudinal axis of the upright housing or front post 31A. Drive and steering means 66 has a generally longitudinal tiller bar 67. A clamp 68 attaches the midportion of bar 67 to a head 69. The head 69 is attached to the upper end of the fork member 35A. The clamp 68 is releasably mounted on the tiller bar 67 whereby the longitudinal position of the tiller bar 67 can be adjusted relative to the seat 25A according to the requirements of the cyclist.

The drive and steering means has a first drive linkage 71 drivably coupled to a second drive linkage 72. A double hand crank assembly 73 operates the second drive linkage 72 which in turn operates the first drive linkage 71 and thereby imparts driving torque to the front wheel 38A.

The first drive linkage 71 includes a sprocket 74 attached to the hub or drive structure for the wheel 38A. A first roller chain 76 is trained about sprocket 74 and is in operative engagement with a large sprocket 77 rotatably mounted on the forward end of the tiller bar 67. Sprocket 77 is secured to a transverse shaft 78 carrying a second smaller sprocket 79. Shaft 78 is mounted in suitable bearings attached to the plates 49A secured to the forward end of the tiller bar 67 and to the upright supports 48A.

The second drive linkage 72 includes a roller chain 81 trained over sprocket 79 and a rear sprocket 82. Sprocket 82 is attached to a mid-transverse section of the double handle crank assembly 73. The mid-section 83 is rotatably mounted in suitable bearings and attached to the rear end of tiller bar 67.

The double handle crank assembly 73 is identical to the crank assembly 54. Crank assembly 73 has oppositely directed arms 84 and 86. Attached to the outer ends of the arms 84 and 86 are outwardly directed handles 87 and 88, respectively, which provide hand grips for the crank assembly 73. The second drive linkage 72 is enclosed in a shield 89.

In use, the hand crank assembly 73 is operated by the cyclist applying alternating rotating movement with the hands gripping the handles 87 and 88. This action rotates a sprocket 82 driving the chain 81. Chain 81 drives the sprocket 79 which through shaft 78 drives the large sprocket 77. The chain 76 imparts the rotation of sprocket 77 to the sprocket 74 attached to the wheel 38A.

The cycle is guided or steered by the use of the tiller bar 67. The cyclist applies lateral force on the crank assembly, thereby rotating the fork member 35A to steer the front wheel 38A. The hand crank assembly 73 is positioned where it is comfortable to the cyclist seated on the seat 25A and provides a torque arm or steering leverage so that the cycle can be easily steered in either direction. While there have been shown and described preferred embodiments of the cycle of the invention, it is understood that various changes, modifications and substitutions can be made by those skilled in the art without departing from the invention. For example, the drive linkages 43 and 71 can be the bevel gear and shaft arrangement as shown in FIG. 4.

The embodiments of the invention in which an exclusive property or privilege is claimed are defined as follows:

1. A cycle comprising:
   a frame;
   rear wheel means rotatably mounted on a rear portion of the frame;
   front wheel means, means mounting the front wheel means on a front portion of the frame, said means mounting the front wheel means being rotatable about a generally upright axis to steer the cycle;
   seat means mounted on the frame;
   tiller means releasably and adjustably secured to the means mounting the front wheel means, said tiller means being longitudinally adjustable relative to said mounting means and having a first portion extended in a forward direction and a second portion extended in a rearward direction from said mounting means;
   support means connected between the first portion of the tiller means and the means mounting the front wheel means, said support means and said tiller means being of fixed length.
   drive means having a first drive linkage drivably connecting the front wheel with the forward portion of the tiller means and a second drive linkage connecting the first drive linkage and the rear portion of the tiller means, and means for imparting torque to the rear portion of the second drive linkage.

2. The cycle of claim 1 wherein: the means for imparting torque to the second drive linkage comprises a double hand crank assembly.

3. The cycle of claim 1 wherein: the rear wheel means comprise a first wheel rotatably mounted on one side of the frame and a second wheel rotatably mounted on the opposite side of the frame.

4. The cycle of claim 1 including: means mounting the seat means on the rear portion of the frame.

5. The cycle of claim 1 wherein: the first drive linkage comprises a chain and sprocket drive including a sprocket drivably connected to the front wheel and a second sprocket rotatably mounted on the forward end of the tiller means and a chain trained about said first and second sprockets.

6. The cycle of claim 5 wherein: said second drive linkage means comprises a pair of first bevel gears drivably connected to the second sprocket, a pair of second bevel gears drivably connected to the means for imparting torque to the second drive linkage and a shaft connecting one of the bevel gears of the first pair of bevel gears with one of the bevel gears of the second pair of bevel gears.

7. The cycle of claim 6 wherein: the means for imparting torque to the second drive linkage comprises a double handle crank assembly, one of said bevel gears being mounted on a portion of the double handle crank assembly.

8. The cycle of claim 5 wherein: the second drive linkage comprises a chain and sprocket drive having a first sprocket drivably connected to the second sprocket on the forward end of the tiller means, a second sprocket rotatably mounted on the rear end of the tiller means and an endless chain trained about said first and second sprockets, said second sprocket of the second drive linkage being drivably connected to the means for imparting torque to the second drive linkage.

9. The cycle of claim 8 wherein: said means for imparting torque to the second drive linkage means comprises a double handle crank assembly, said second sprocket being mounted on a portion of said crank assembly.

10. The cycle of claim 1 wherein: the tiller means comprises an elongated tubular member.

11. The cycle of claim 1 including: foot rest means attached to the frame, said foot rest means being located generally below said means for imparting torque to the second drive linkage means.

* * * * *